United States Patent
Couture

[11] 3,792,613
[45] Feb. 19, 1974

[54] PULSE-ECHO ULTRASONIC TEST APPARATUS WITH CATHODE RAY TUBE DIGITAL DISPLAY

[75] Inventor: John W. Couture, Danbury, Conn.

[73] Assignee: Krautkramer-Branson, Incorporated, Stamford, Conn.

[22] Filed: May 19, 1972

[21] Appl. No.: 255,187

[52] U.S. Cl......... 73/67.9, 340/324 A, 340/324 AD
[51] Int. Cl. .......................................... G01n 29/04
[58] Field of Search. 340/154, 212, 324 A, 324 AD, 340/366; 315/18, 19; 73/67.7, 67.8, 67.9

[56] References Cited
UNITED STATES PATENTS

| | | | |
|---|---|---|---|
| 3,533,280 | 10/1970 | McGaughey et al. | 73/67.9 |
| 3,624,712 | 11/1971 | Weighart | 73/67.9 |
| 3,631,457 | 12/1971 | Hitachi-shi | 340/324 A |
| 3,721,856 | 3/1973 | Dick | 315/18 |
| 3,624,632 | 11/1971 | Ophir | 340/324 A |

Primary Examiner—Richard C. Queisser
Assistant Examiner—Arthur E. Korkosz
Attorney, Agent, or Firm—Ervin B. Steinberg

[57] ABSTRACT

In an ultrasonic pulse-echo test apparatus a two-coordinate display and digital data correlated with certain parameters of the two-coordinate display are displayed on the same cathode ray tube screen. To this end, the apparatus comprises a pulse-echo ultrasonic circuit and a digital character writing circuit. Both circuits are synchronized by a common timing means and are alternatingly coupled by multiplexing means to the deflection amplifiers of the CRT. Means are provided to convert pulse-echo analog information to digital information, to select the desired analog information for display, and to cyclically control the writing of the two-coordinate display and of the digital information.

28 Claims, 9 Drawing Figures

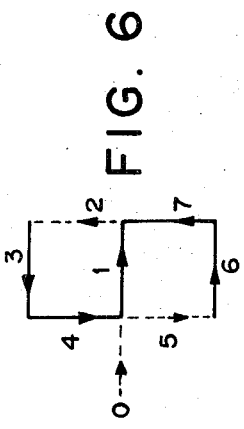
FIG. 5
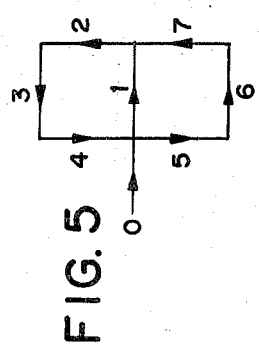
FIG. 6
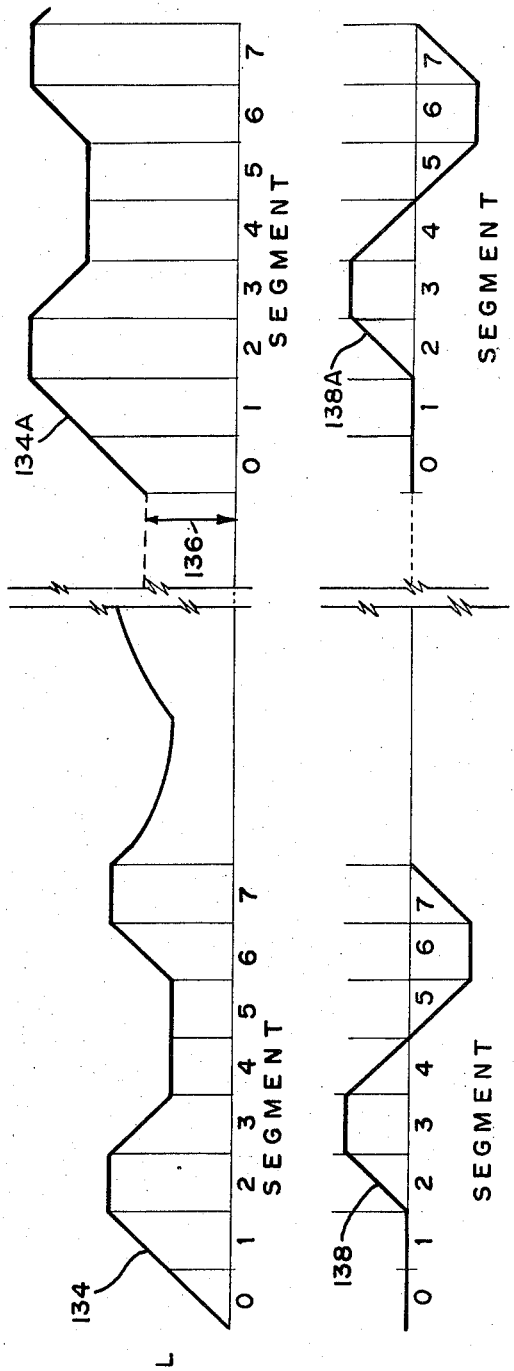
FIG. 7A
DIGIT HORIZONTAL WRITING SIGNAL
FIG. 7B
DIGIT VERTICAL WRITING SIGNAL
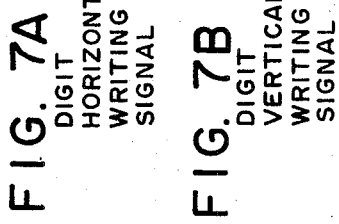
FIG. 7B
UNBLANKING SIGNAL NUMERAL 5

PULSE-ECHO ULTRASONIC TEST APPARATUS WITH CATHODE RAY TUBE DIGITAL DISPLAY

BACKGROUND OF THE INVENTION

Pulse-echo ultrasonic test apparatus are used widely for testing workpieces for the presence of hidden flaws, delaminations, and voids, and for gaging the thickness of plate stock, bars, etc. from one side. Similarly, the same apparatus or a slightly simplified version is employed extensively in corrosion surveys where it is necessary to periodically establish the safe operation of boilers, digesters, pipe lines and the like by measuring the remaining wall thickness. Such pulse-echo test instruments and the appropriate test methods are well known, see for instance "Ultrasonic Engineering" (book) by Julian R. Frederick, John Wiley & Sons, Inc. (1965) pp. 244 to 307, and "Ultrasonics in Industry" by E. P. Steinberg, Proceedings of the IEEE, Vol. 53, No. 10, October 1965 pp. 1,292 to 1,296.

Generally, in an ultrasonic pulse-echo test apparatus an electrical pulse generator providing cyclically pulses at an ultrasonic frequency, typically at a frequency in the range from 1 to 50 MHz, and at a selected pulse repetition frequency is connected to a transducer probe which is acoustically coupled to an exposed surface of the workpiece to be tested. Responsive to the receipt of the electrical pulse, the transducer probe transmits an ultrasonic search signal into the workpiece and as the search signal intercepts an acoustic discontinuity in the workpiece (flaw, delamination or rear surface), a reflection or echo signal is produced which subsequently is sensed by the transducer probe. The transducer probe converts the acoustic signal received to an electrical signal which is processed by a receiving circuit. A cathode ray tube is used most commonly to provide a coordinate display of elapsed time (transit time of acoustic signal) versus echo responsive electrical signal amplitude. This is the well known A-scan representation. Similarly to radar, B-scan and C-scan representations are also available in pulse echo testing to meet special demands.

In recent years digital display devices have been combined with pulse-echo test apparatus. Most digital display devices are separate entities or attachments to the standard pulse-echo apparatus and make use of numerical display tubes, e.g. "Nixie" tubes. To provide the digital display, a peak voltage (analog signal) representing ultrasonic signal transit time, for example, can be converted to a digital output. Alternatively, an oscillator may be keyed for a time span commensurate with the transmission of a search signal into the workpiece to the receipt of the echo signal, or for a time span extending over a set of successive echo signals, to as to cause the quantity of cycles of operation of the oscillator to be indicative of the time span which, in turn, provides a measure of the workpiece thickness, see "Ultrasonic Testing of Materials" (book) by J. and H. Krautkrämer, 2nd edition, Springer Verlag, New York, N.Y. (1969) pp. 205 to 207.

The above arrangements have several disadvantages. The cathode ray tube and the digital display, each requires its separate power supply and, hence, the power drain becomes excessively large, particularly when a portable battery-operated instrument is involved. The displays indicating digital and two-coordinate video information appear on two separate areas of the instrument, thus adding to operator inconvenience. The two-instrument arrangement also reduces read-out reliability while enlarging instrument size, both significant shortcomings in modern technology. Last, but not least, each digital display, lacking visual persistence, can display only a single number to the operator, hence making it impossible to display simultaneously two or more related quantities without multiplying the quantity of digital display devices.

BRIEF SUMMARY OF THE INVENTION

The present invention provides a two-coordinate video display and a correlated digital display on the same cathode ray tube screen using the same electron beam deflection amplifiers for alternatingly writing the two-coordinate video display and the digital display. Moreover, a quantity of digital displays can be written successively, however the persistency of the cathode ray tube screen makes it possible to simultaneously view the video display and the digital displays, the latter showing information correlated with the two-coordinate pulse-echo display.

More specifically, the present invention includes a pulse-echo test circuit and a digital character generation means coupled to the pulse-echo circuit. The pulse-echo circuit and the character generation means are connected alternatingly by multiplexing means to the horizontal and vertical deflection amplifiers for a cathode ray tube for providing on the screen of the tube during a first portion of the cycle determined by the repetition frequency the two-coordinate pulse-echo scan display (A-scan presentation, for instance) and during a second portion of the cycle a part of the digital display the data of which are correlated with the scan display. Additional means are provided to produce a plurality of digital outputs, each comprising a plurality of digits. The persistency of the screen makes all of the information visible simultaneously for convenient scanning and continuous observation by an operator.

In the present illustrative example of the invention the two-coordinate scan display is produced cyclically during a first portion of the time cycle whereas during a second portion of the same time cycle is a single numeral of a four-digit number is provided. As shown and described in the typical embodiment hereafter, four four-digit numbers can be presented in conjunction with the two-coordinate echo display.

One of the principal objects of this invention is, therefore, the provision of a new and improved pulse-echo ultrasonic test apparatus.

Another principal object of this invention is the provison of an ultrasonic test apparatus which provides a two-coordinate scan display of pulse-echo ultrasonic signals and a digital display of information correlated with such signals.

Another object of this invention is the use of a cathode ray tube for displaying on the screen of such a tube both the two-coordinate scan display and the digital information.

A further object of this invention is an arrangement of electronic circuits for providing in a correlated and timed manner a two-coordinate scan display of pulse-echo ultrasonic signals and the generation and display of digital information.

A still further object of this invention is the provision of a pulse-echo ultrasonic test apparatus which uses the horizontal and vertical deflection amplifiers of a conventional cathode ray tube for writing on the same screen alternatingly the two-coordinate scan display provided by a pulse-echo ultrasonic test apparatus and digital data correlated with the pulse-echo test procedure.

Further and still other objects of this invention will be more clearly apparent from the following description when taken in conjunction with the accompanying drawing.

BRIEF DESCRIPTION OF THE DRAWING

FIG. 5 is an illustration of the digit writing method employed;

FIG. 6 is an illustration of numeral 5 written by the method used in this invention, and FIG. 7 is a diagram of wave shapes for illustrating the digital writing technique used.

PREFACE

Figure 1:
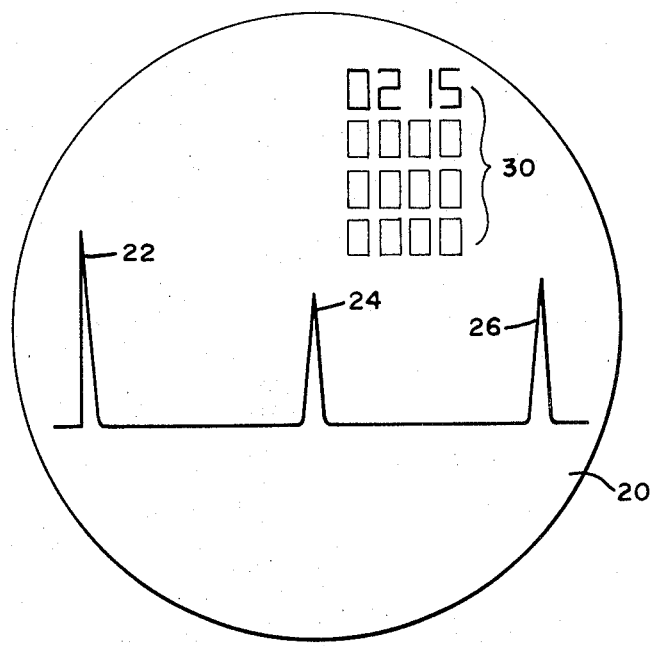
FIG. 1 is a view of the cathode ray tube screen for illustrating schematically the display achieved by the present invention.

The circuits described hereafter make use of 10-line and 2-to-4 line decoders. In most commercially available decoders the "activated" line assumes a negative potential relative to the non-activated lines. For the present embodiment it is assumed that the activated line assumes a positive potential relative to the non-activated lines, such inversion being accomplished by an inverter stage connected in each of the output lines. For the sake of simplification, the inverter stages have been omitted from the drawing and description. When using decoders in which the activated output line assumes a positive potential, the above requirement for respective inverter stages does not apply.

DESCRIPTION OF THE PREFERRED EMBODIMENT

Referring now to the figures and FIG. 1 in particular, there is shown the information presentation resulting from the combination of elements of the present invention. The screen of a cathode ray tube 20 displays a conventional two-coordinate pulse-echo A-scan, in which the amplitude of the signals appearing on the transducer probe is plotted against a horizontal time base axis. Numeral 22 indicates the acoustic signal generated by the search pulse at the entrant surface of the workpiece, numeral 24 identifies a flaw responsive echo signal and numeral 26 the signal produced by the rear surface of the workpiece. The horizontal distance from the leading edge of signal 22 to signal 24 is a measure of the depth of the flaw below the workpiece surface, and the distance from signal 22 to the echo signal 26 is indicative of the thickness of the workpiece at the tested portion. In addition to the analog presentation, the screen 20 includes also a digital character display of four numbers 30, each number comprising, in the present example, four digits. It should be noted that the scan display and the digital display are contained on the same screen, thus obviating the need for a special and separate digital display unit.

Figure 2:
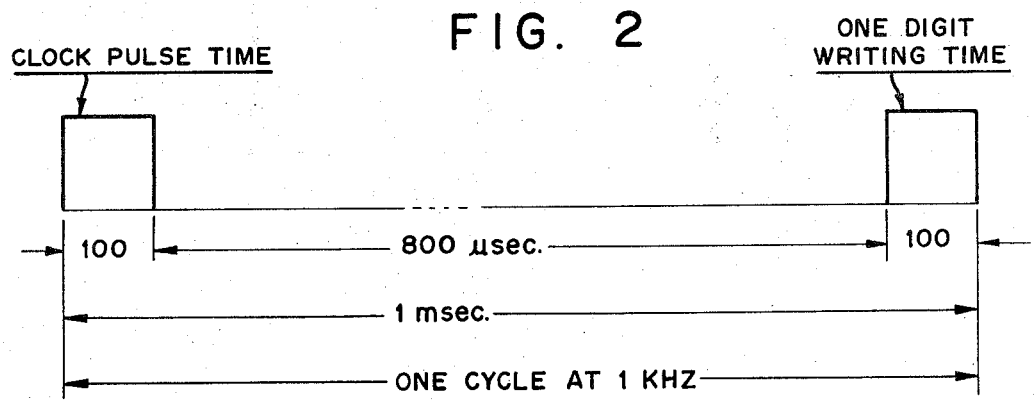
FIG. 2 is a schematic timing diagram showing the writing sequence of the displays.

FIG. 2 explains more clearly the sequence of providing the display on the cathode ray tube screen 20. In the present example, as will be more clearly apparent hereafter, each cycle of operation is selected to have a duration of 1,000 microseconds, i.e. 1 kHz repetition rate frequency. The clock or synchronizing pulse for energizing the pulse generator which, in turn, energizes the transducer probe for generating the acoustic search signal occurs during the first 100 microseconds of the cycle. The scan display resulting from the search pulse traversing the workpiece occurs during the first 900 microseconds and generally takes place only during an initial portion of the stated time span. The final time portion of the cycle, i.e. 100 microseconds, is reserved for writing one digit of the digital display 30. Thus, for writing 16 digits, 16 writing cycles are required. Due to the persistency of the screen all information will remain visible despite the intermittent occurrence of the respective writing traces.

A further important feature of the present invention concerns the fact that the cathode ray tube is a conventional tube and the pulse-echo trace 22, 24, 26 as well as the digital display 30 are provided by the tube's electron beam controlled by the horizontal and vertical deflection amplifiers. To this end, these amplifiers are coupled to multiplexing means for being coupled alternatingly during the respective time periods either to the circuit which provides the pulse-echo responsive signal or to the circuit which generates the digital display signals. Moreover, circuit means are provided to cause the digital display 30 to indicate values correlated with the echo signals 24 and 26 respectively.

PULSE-ECHO DISPLAY CIRCUIT

Figure 3:
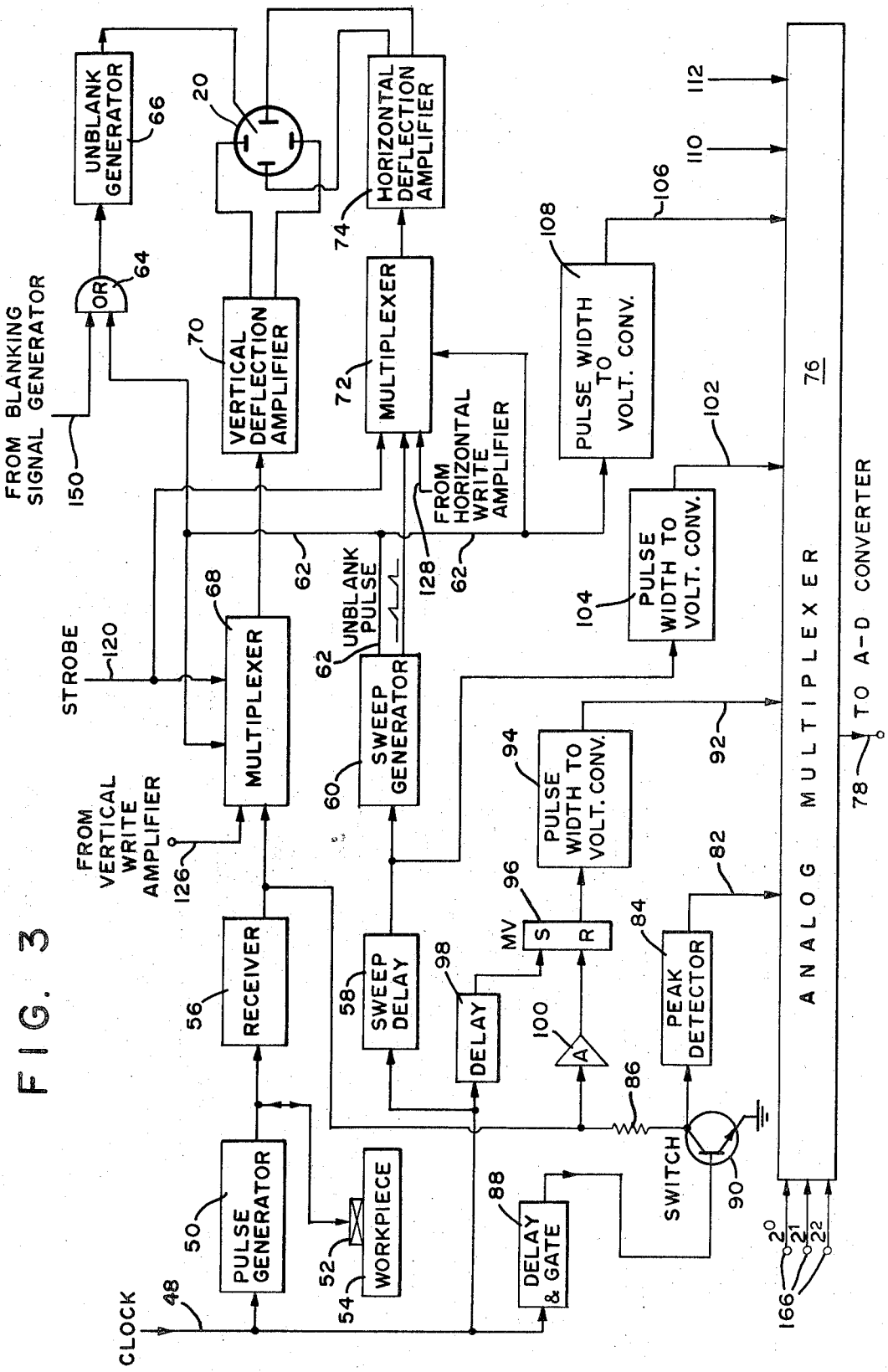
FIG. 3 is a schematic electrical circuit diagram of a portion of the present apparatus.
Figure 4:
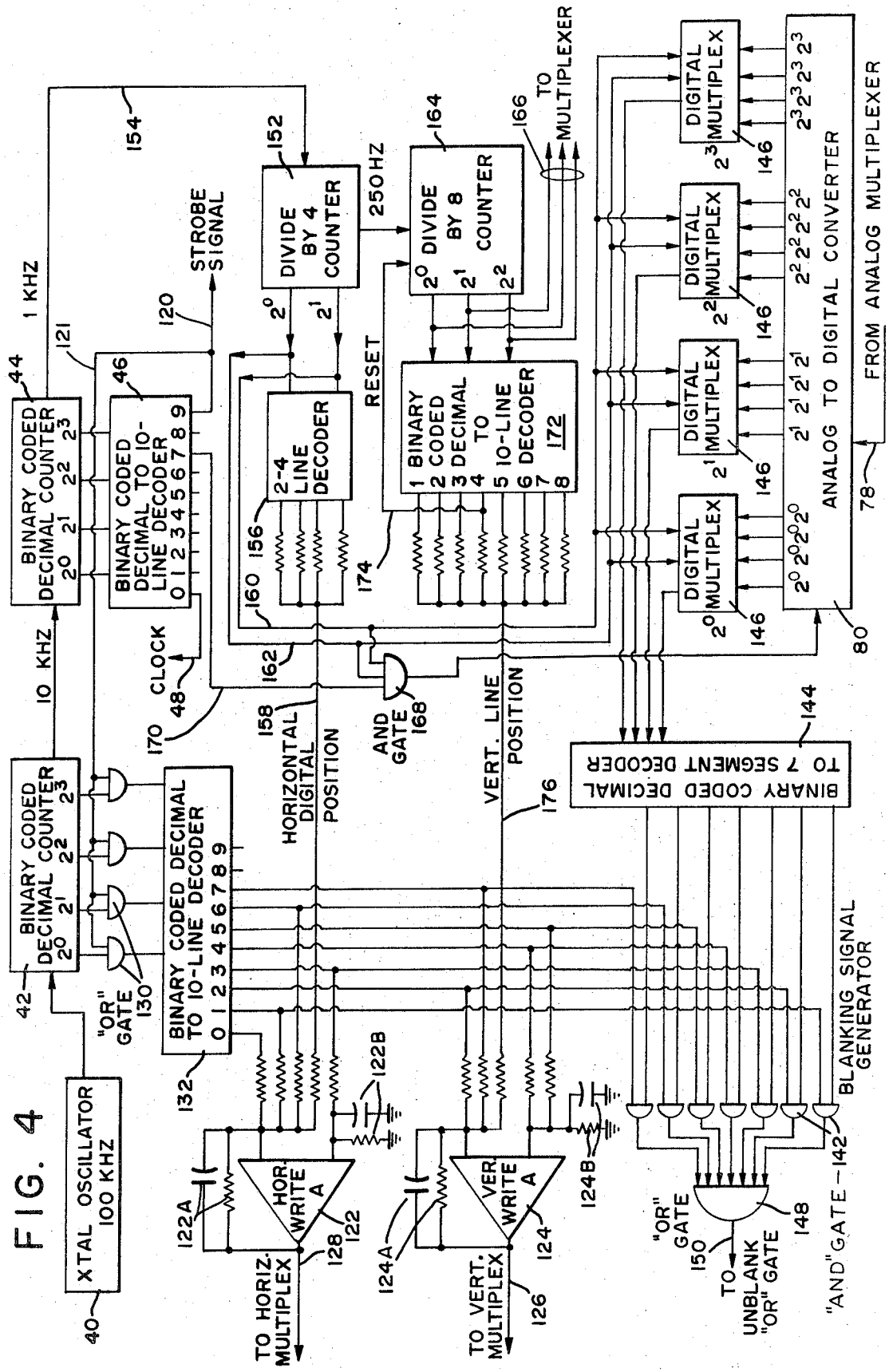
FIG. 4 is a schematic electrical circuit diagram of another portion of the present apparatus.

The specific arrangement of the various elements forming a preferred embodiment of the instant invention is more clearly apparent by referring to FIGS. 3 and 4. The basic pulse-echo ultrasonic test apparatus, as stated heretofore, is operated at 1 kHz repetition frequency. This 1 kHz frequency signal providing the clock or synchronizing signal is derived from a 100 kHz crystal controlled oscillator 40 (FIG. 4) via a first binary coded decimal counter 42 and a second binary coded decimal counter 44 which is coupled to a binary coded decimal to 10-line decoder 46. The decoder 46 sequentially presents mutually exclusive pulses of 100 microseconds duration on each of the 10 lines, numbered 0 to 9. The line activated at any instant corresponds to the count in the divider 46 at that particular moment. The clock pulse is derived from line 0, conductor 48. The clock pulse energizes the ultrasonic pulse generator 50, FIG. 3, which excites the transducer probe 52 and which, being acoustically coupled to the surface of a workpiece 54, transmits an acoustic search signal into the workpiece. The receiver circuit 56 receives echo signals developed either by the same transducer probe or another transducer probe, e.g. when through-transmission is used. The clock pulse, conductor 48, is used also to excite a sweep delay circuit 58 which is coupled to a sweep generator 60.

At the time of sweep generation the sweep generator 60 generates also an unblanking pulse, conductor 62, which is applied to an OR gate 64 and an in series connected unblanking generator 66 for unblanking the cathode ray tube screen 20. The unblanking pulse is coupled, furthermore, to the multiplexer 68 for coupling the output signal from the receiving circuit 56 to the vertical deflection amplifier 70 for applying the pulse-echo responsive signal to the vertical deflection electrodes of the cathode ray tube. Finally, the unblanking signal, conductor 62, is transmitted also to the multiplexer 72 for connecting the time sweep circuit to the horizontal deflection amplifier 74 and to the horizontal deflection electrodes of the cathode ray tube. In the above mode the circuit just described operates substantially as a conventional ultrasonic test instrument, providing an A-scan representation on the screen 20.

The lower portion of FIG. 3 depicts the arrangement by which the parameters to be displayed digitally on the screen 20 are fed via an analog multiplexer 76 and conductor 78 to an analog-to-digital converter 80, FIG. 4. Conductor 82 receives a signal from a peak detector circuit 84 which is coupled via a resistance 86 to the output signal from the receiver circuit 56. The clock pulse, line 48, is supplied also to an adjustable delay and gate circuit 88 which is coupled to the base electrode of a transistor 90 operating as a switch. The peak detector circuit 84 charges during the time period in which the delay and gate circuit 88 is inoperative. Hence, the conductor 82 provides to the multiplexer 76 a signal which is responsive to the amplitude of the signal or signals received by the receiver circuit 56, for instance, the peak of flaw responsive signals. Conductor 92, also providing an input to the analog multiplexer 76, receives a signal from the pulse width to voltage converter 94 which is coupled with its input to a multivibrator circuit 96. The multivibrator 96 is started via a delay circuit 98 from the clock pulse, conductor 48, and is reset responsive to the receipt of a signal provided by the receiving circuit 56 via an amplifier 100. Hence, conductor 92 provides a signal indicative of the time delay from pulse generator 50 activation to the first received echo signal of predetermined amplitude. Conductor 102, coupled to a pulse width to voltage converter 104, provides a value commensurate with sweep delay time since the converter 104 is coupled with its input to the output from the sweep delay circuit 58. Conductor 106 receives a signal from the pulse width to voltage converter 108 which is coupled to the sweep generator 60, causing conductor 106 to provide to multiplexer 76 a signal responsive to sweep length. Inputs 110 and 112, as shown, are left open in the present example. It will be apparent to those skilled in the art that the input conductors 82, 92, 102, 106, 110 and 112 are merely exemplary of a great variety of information which may be displayed in digital form, yet being correlated with the pulse-echo test procedure and the data resulting therefrom.

DIGITAL CHARACTER GENERATION AND DISPLAY

As indicated heretofore, the deflection amplifiers 70 and 74 are used to write during the time interval of 100 microseconds preceding the clock pulse one digit of the digital character display, see FIG. 2. During this latter time interval a strobe or timing signal provided by conductor 120 and derived from the 9 line of the binary coded decimal to 10-line decoder 46, FIG. 4, is applied to the multiplexer 68 and to multiplexer 72 for enabling the horizontal digit write amplifier 122 and the vertical digit write amplifier 124 coupled via conductors 126 and 128 to the respective multiplexers 68 and 72 to transmit the digit write signal to the electron beam deflection amplifiers 70 and 74.

The writing of digits using a pair of deflection amplifiers, a cathode ray tube screen and shaped voltage signals is revealed generally in the article "Digital Indication on Cathode-Ray Tubes" by P. Sieber, Elektronik 1967, No. 10, pp. 1-8 (Franzis-Verlag G. Emil Mayer K.G. Munich, West Germany) which article is incorporated herein by reference. The circuit revealed hereafter has been adapted from the above description for the present purpose.

For writing a digit the outputs of the binary coded decimal counter 42 (divide by 10 counter) are connected through a set of OR gates 130 to a binary coded decimal to 10-line decoder 132. In the present example, using a master oscillator with a frequency of 100 kHz, the respective output signals on output lines numbered 0 to 9 appear for 10 microsecond intervals, one at a time. Each output signal is used to move the cathode ray tube electron beam through one segment of the digit.

FIGS. 5 through 7 illustrate the writing of the digit in a more detailed manner. Each digit is formed by moving the electron beam sequentially through seven discrete segments, see FIG. 5. As seen, the beam will trace first the segment 1, then segment 2, segment 3, etc. to segment 7. The particular numeral rendered visible on the cathode ray tube screen depends upon the timed use of the unblanking signal during the write time. Thus, the numeral 5 is traced by providing an unblanking pulse during the time in which the trace traverses the segments 1, 3, 4, 6 and 7, but blanking the screen during the time intervals during which the segments 2 and 5 are traced. In addition, there is an 0 numbered lead trace to the digit. For all practical purposes the 0 segment remains blanked out.

FIGS. 7A and 7B show the wave shapes provided by the horizontal and vertical write amplifiers 122 and 124. Numeral 134 shows the output wave shape appearing at the horizontal write amplifier 122 (FIG. 4) during the 0 to 7 trace periods. Each trace segment, such as the segment or ramp 1 in the present example is 10 microseconds long. The same trace is repeated during the next write cycle, see curve 134A, however, the starting point of the repeated trace signal is elevated by a bias voltage having an amplitude 136 which corresponds to approximately 0.75 times the peak of the preceding signal during the 2 and 7 segments. The bias provides the lateral spacing of the second digit from the preceding digit, i.e. space of one digit plus inter-digit spacing. The same wave shape is repeated, respectively biased, for the third and fourth lateral digits after which time a resetting operation takes place in order to cancel the incrementally applied bias voltage. The particular wave shape of curve 134 is achieved by the use of networks 122A and 122B coupled to the amplifier 122, the networks causing the amplifier 122 to act as a low-pass filter.

Curve 138 shows the corresponding wave shape provided by the vertical write amplifier 124 during the same time interval in which the write signal 134 is provided by the horizontal write amplifier 122. This same wave shape is repeated, curve 138A, to coincide in time with the signal 134A. As before, the vertical write amplifier 124 is also provided with networks 124A and 124B for causing this latter amplifier to act as a low-pass filter.

FIG. 7C shows the use of the unblanking signal 140 for writing numeral 5. As seen in FIG. 6, the unblanking signal is ON during segments 1, 3, 4, 6 and 7, but is OFF during the segments 0, 2 and 5. During the writing periods, the trace on the screen of the cathode ray tube 20 is, of course, the vector sum of the signals 134 and 138 or 134A and 138A respectively.

Continuing now with the circuit description, the output lines from the binary coded decimal counter 42 are coupled through OR gates 130 which effectively disconnect the output lines of the binary coded decimal to 10-line decoder 132 from the horizontal and vertical write amplifiers 122 and 124 until the writing time arrives as determined by a signal from the line 9 of the binary coded decimal to 10-line decoder 46, conductor 120, which signal is identified as "strobe" signal. This strobe signal is fed via conductor 121 to the OR gates 130. The strobe signal, conductor 120, is coupled also to the multiplexers 68 and 72 which at that time are used to block signals from the receiver circuit 56 and sweep delay circuit 58 in order to pass only the digital write input signals from the vertical and horizontal digit write amplifiers provided by conductors 126 and 128 respectively.

As stated in connection with FIGS. 7A and 7B, the wave forms produced by the write amplifiers 122 and 124 contain ramps for causing the electron beam to move up or down, or left or right, for writing the appropriate digit. The ramps are generated by causing the write amplifiers to act as low-pass filters on the pulse signal coming from the decoder 132. The direction of the ramps is determined by which summing input (positive or negative) of the amplifier is keyed by the appropriate pulse. It should be noted, as explained heretofore, that the electron beam always traverses the same path and that the numeral display, is determined by those segments which are unblanked. The unblanking function is controlled by a blanking signal generator which includes seven AND gates 142, one input of each gate being connected to the decoder 132 and the other input to the binary coded decimal to 7-segment decoder 144. The decoder 144 receives four inputs from a set of four digital multiplexers 146, each such multiplexer supplying the signal for writing the appropriate first, second, third and fourth digit of the four multiple digit displays. The outputs from the decoder 132 and decoder 144, after going through the AND gates 142, are fed to an OR gate 148 to provide and control the timed numeral writing unblanking signals to OR gate 64, FIG. 3, along conductor 150. In this manner the appropriate segment of each digit is written.

As stated previously, the typical embodiment of the invention disclosed provides a display comprising four sets of numbers, each number comprising four digits, and as shown in connection with FIG. 2 one digit is written during each cycle, thus requiring four cycles to complete one set of numbers and 16 cycles for completing all of the digital information available. The digit to be written is selected by the divider circuit 152 which divides the incoming 1 kHz signal from the decimal counter 44, conductor 154, by a factor of 4. The two binary output conductors from the divider 152 are coupled to the two-line binary to four-line decoder 156. A pulse having a length equal to one complete cycle (1 millisecond) is available, one at a time, on each of the output lines. These pulses from decoder 156 are applied via conductor 158 to the summing network associated with the horizontal write amplifier 122 for providing the bias voltage (FIG. 7A) which shifts the writing position sequentially to the appropriate lateral digit area.

In addition, the binary output signals from the counter 152 are fed via a set of conductors 160 and 162 as input signals to each of the digital multiplexers, 146 which, as stated previously, switch the appropriate digital output from the analog to digital converter 80 to the binary coded decimal to seven-segment decoder 144. The type of information, i.e. the information occupying one of the four lines, displayed is controlled by a divide-by-8 counter 164. The binary signal output conductors from the counter 164 are coupled via conductors 166 to the analog multiplexer 76, FIG. 3, which receives the analog input information available for display via conductors 82, 92, 102, and 106. The signal supplied by the respective conductors 82, 92, 102 and 106 is connected to the converter 80 for 4 milliseconds, which is the time required (four cycles) to write sequentially the four digits comprising one set of digital characters occupying one line. The analog to digital converter 80 is controlled for performing the required conversion of analog information to digital data during a time interval which precedes the 100 microsecond digital write time. The control signal for initiating the conversion interval is provided by the AND gate 168 which is coupled for receiving the signals supplied by the conductors 160, 162 and the timing signal via line 7, conductor 170, from the decoder 46. It should be noted that the signal in line 7 (conductor 170) precedes the strobe signal (line 9), conductor 120, thus providing the required conversion time interval.

The vertical line position for the digital display is controlled by a binary coded decimal to 10-line decoder 172 which is connected with its input to the counter 164. When a signal appears on the 4 line, the fourth output line, a reset signal is applied via conductor 174 to the counter 164 since only four lines of information are written in the present example. The output from the decoder 172 is coupled via conductor 176 to the vertical write amplifier circuitry 124 for shifting the vertical display in accordance with the inputs received from conductors 82, 92, 102 and 106. Lines 5, 6, 7 and 8 of decoder 172 are not used in the present example.

The means for generating a decimal point has not been shown since the provision of a decimal is not an absolute necessity. However, as is understood by those skilled in the art, it is readily possible to write a decimal point by holding the electron beam steady for a period of approximately 10 microseconds immediately preceding the writing time allotted for the succeeding digit and unblanking.

It will be apparent to those skilled in the art that the novel pulse-echo test apparatus disclosed hereinabove constitutes a major advance in the art by combining a pulse-echo display and a correlated digital display in a unitary manner. The instrument is most convenient to use and obviates the need for separate instruments, each subject to its peculiar inaccuracy and calibration requirement.

While the description above specifically illustrates an A-scan display, it should be apparent that a B-scan or C-scan coordinate display may be substituted without departing from the scope of the invention. Similarly, the four-digit display, the four parameters, and the specific frequencies and resulting timing cycles are merely illustrative of a typical and convenient embodiment which, of course, is subject to wide changes and variation, all within the broad scope of the present invention.

What is claimed is:

1. A pulse-echo ultrasonic test apparatus comprising:

electrical pulse means for cyclically generating an electrical high frequency pulse;
electro-acoustic transducer means adapted to be coupled to a workpiece;
means coupling said electrical pulse means to said transducer means for causing said transducer means, responsive to the receipt of a high frequency pulse, to cyclically transmit an ultrasonic search signal into the workpiece and subsequently to receive an echo signal arising from an acoustic discontinuity intercepted by the respective search signal, said transducer means providing an echo responsive electrical signal;
a cathode ray tube having a display screen;
means coupled to said transducer means and to said cathode ray tube for receiving said echo responsive electrical signal and providing a scan display thereof on said screen, and
means coupled to said pulse means and to said means for receiving said echo responsive electrical signal and being actuated cyclically during the period between the receipt of an echo signal and the next succeeding transmission of an ultrasonic search signal for providing on said screen a digital display of a quantity correlated with said echo signal.

2. A pulse-echo ultrasonic test apparatus comprising:

an electrical pulse generator adapted to provide when energized an electrical high frequency pulse;

electro-acoustic transducer means coupled to said pulse generator and adapted to be coupled acoustically to a workpiece for transmitting into the workpiece an ultrasonic search signal responsive to the energization of said pulse generator, and for receiving a search signal responsive echo signal arising from an acoustic discontinuity in the workpiece intercepted by the respective search signal, such echo signal being transformed by said transducer means to an electrical output signal;
first electrical circuit means including a cathode ray tube coupled to said transducer means for receiving said output signal and for providing on the screen of said cathode ray tube a two-coordinate scan display of said output signal;
second electrical circuit means adapted to produce a digital display on said screen coupled to said first electrical circuit means for providing a digital indication of a quantity correlated with said output signal, and
third electrical circuit means coupled to said first circuit means and to said second electrical circuit means for providing on said screen during a first portion of a predetermined timing cycle said scan display and during a second portion of said timing cycle said digital indication.

3. A pulse-echo ultrasonic test apparatus as set forth in claim 2, said first electrical circuit means including a vertical and a horizontal deflection amplifier for providing electron beam deflection on said cathode ray tube screen; said third electrical circuit means including switching means coupled to said amplifiers, to said first electrical circuit means and to said second electrical circuit means and controlled by timing means for causing during said first portion said scan display and during said second portion said digital indication.

4. A pulse-echo ultrasonic test apparatus as set forth in claim 3, said scan display being an A-scan representation indicating echo responsive signal amplitude versus time.

5. A pulse-echo ultrasonic test apparatus as set forth in claim 4, said digital indication being correlated with the amplitude of the echo signal displayed by said scan display.

6. A pulse-echo ultrasonic apparatus as set forth in claim 2, said digital indication being correlated with the time interval between the transmission of said search signal into the workpiece and the receipt of a search signal responsive echo signal by said transducer means.

7. A pulse-echo ultrasonic test apparatus as set forth in claim 2, said scan display being produced at one location of said screen and said digital indication at another location of said screen.

8. A pulse-echo ultrasonic test apparatus as set forth in claim 2, said second circuit means adapted to produce a digital indication comprising a plurality of digital characters, and control means coacting with said third circuit means for causing during said second portion of said timing cycle sequentially the display of one of said characters.

9. A pulse-echo ultrasonic test apparatus comprising:

timing means for producing cyclically a pulse signal and thereby establish a predetermined timing cycle;
pulse generator means coupled to said timing means for producing an electrical high frequency pulse responsive to the receipt of a pulse signal from said timing means;
electro-acoustic transducer means coupled to said pulse generator means and adapted to be acoustically coupled to the surface of a workpiece for transmitting into the workpiece an ultrasonic search signal responsive to the energization of said transducer means by said high frequency pulse from said pulse generator means and for receiving a search signal responsive echo signal arising from an acoustic discontinuity in the workpiece intercepted by the respective search signal, such echo signal being transformed by said transducer means to an electrical signal;
electrical receiving means coupled to said transducer means for receiving said electrical signal and providing an analog output signal;
time sweep means coupled to said timing means for producing a time sweep signal responsive to the pulse signal produced by said timing means;
a signal display circuit which includes the interconnection of multiplexing means, deflection amplifiers and a cathode ray tube;
character signal generating means coupled to said receiving means for receiving therefrom said output signal and for generating in response thereto signals for producing on said cathode ray tube a digital character display whose numerical value is responsive to said output signal;

means coupling said signals for producing said digital character display, said output signal and said sweep signal to said multiplexing means, and means coupling said timing means to said multiplexing means for causing said multiplexing means to be conditioned during a first portion of said timing cycle for providing to said deflection amplifiers said sweep signal and said analog output signal and conditioned during a second portion of said timing cycle for providing to said deflection amplifiers said signals for producing said digital character display;

whereby to cause on said cathode ray tube during each cycle alternatingly a two-coordinate display of said analog signal versus time and a display of said digital characters.

10. A pulse-echo ultrasonic test apparatus as set forth in claim 9, said two-coordinate display being displayed at one location of the screen of said cathode ray tube and said digital character display at another location.

11. A pulse-echo ultrasonic test apparatus as set forth in claim 9, said two-coordinate display being an A-scan display of the echo responsive signals.

12. A pulse-echo ultrasonic test apparatus as set forth in claim 9, and means causing said digital character display to be correlated with the amplitude of said output signal.

13. A pulse-echo ultrasonic test apparatus as set forth in claim 9, said digital character generating means including means for cyclically generating signals adapted to be used as one of the numerals 0 to 9.

14. A pulse-echo ultrasonic test apparatus as set forth in claim 9, said digital character display comprising a plurality of digits, and control means coupled for causing one digit to be produced on the screen of said cathode ray tube during each second portion of a respective timing cycle.

15. A pulse-echo ultrasonic test apparatus comprising:
a. timing means for establishing a time cycle;
b. first means which include in combination:
  b-1. pulse generating means coupled to said timing means for cyclically being excited by said timing means and producing in response thereto cyclically electrical pulse signals at an ultrasonic frequency;
  b-2. electro-acoustic means coupled to said pulse generating means for receiving said electrical pulse signals and in response thereto transmitting ultrasonic search signals into a workpiece to which said transducer means is acoustically coupled, and providing echo responsive electrical signals arising from an acoustic discontinuity intercepted by said search signals;
  b-3. receiving means coupled to said transducer means for receiving said echo responsive electrical signals and providing in response thereto electrical output signals;
  b-4. sweep generating means coupled to said timing means for cyclically producing a sweep signal responsive to said pulse generating means being excited;
  b-5. first multiplexing means coupled for receiving said output signals and said sweep signals;

c. second means comprising second multiplexing means coupled to said first means for receiving therefrom analog signals;

d. digital character generation means which include analog to digital converting means coupled to said second multiplexing means for converting the analog signals received by said second multiplexing means to electrical signals suitable for displaying digital characters on the screen of a cathode ray tube;

e. means coupling said signals suitable for displaying said digital characters to said first multiplexing means;

f. display means which include electron beam and deflection amplifier means and a cathode ray tube having a display screen coupled to said first multiplexing means, and g. means coupling said timing means to said first multiplexing means and to said digital character generation means for causing on said screen alternatingly during each time cycle a two-coordinate display of said outout signals versus time and a display of digital characters responsive to analog signals provided by said first means to said second means.

16. A pulse-echo ultrasonic test apparatus as set forth in claim 15, said second multiplexing means being coupled for receiving an analog signal corresponding to the amplitude of the echo responsive electrical output signals provided by said receiving means.

17. A pulse-echo ultrasonic test apparatus as set forth in claim 15, said second multiplexing means being coupled for receiving a signal responsive to the operation of said sweep generating means.

18. A pulse-echo ultrasonic test apparatus as set forth in claim 15, said second multiplexing being adapted to receive a plurality of analog signals from said first means, and means coupling said timing means to said second multiplexing means for selectively providing the appropriate analog signal to said digital character generation means.

19. A pulse-echo ultrasonic test apparatus as set forth in claim 15, said digital character generation means including means for providing signals for displaying a plurality of multi-digit information.

20. A pulse-echo ultrasonic test apparatus as set forth in claim 19, each digit being written by causing the electron beam to traverse a seven-segment path.

21. A pulse-echo ultrasonic test apparatus which includes a cathode ray tube comprising:
means for cyclically transmitting an ultrasonic search signal into a workpiece and receiving in response thereto echo responsive signals arising from an acoustic discontinuity intercepted by the respective search signals;
means coupled for receiving said echo responsive signals and producing in response thereto echo information containing analog signals for display on the screen of the cathode ray tube, and
means coupled for receiving said analog signals and providing in response thereto further signals for producing on said screen both a display of said analog signals and a display of digital characters whose numerical value is correlated with said analog signals.

22. A pulse-echo ultrasonic test apparatus which includes a cathode ray tube as set forth in claim 21, said means coupled for receiving said analog signals causing said displays to be visible substantially simultaneously.

23. A pulse-echo ultrasonic test apparatus which includes a cathode ray tube comprising:
   means for cyclically transmitting an ultrasonic search signal into a workpiece and receiving in response thereto echo responsive signals arising from an acoustic discontinuity intercepted by the respective search signals;
   means coupled for receiving said echo responsive signals and producing in response thereto echo information containing analog signals for display on the screen of said cathode ray tube;
   means coupled for receiving said analog signals and providing in response thereto further signals for producing on the screen a correlated display of digital characters, and
   means coupled for receiving said analog signals and said further signals for causing on said screen alternatingly a display of said analog signals and of at least one of said correlated digital characters.

24. A method for examining a workpiece by the pulse-echo ultrasonic test method comprising the steps of:
   cyclically producing an ultrasonic search signal and transmitting said search signal into the workpiece to be examined;
   sensing the receipt of an acoustic discontinuity responsive echo signal resulting from the transmission of said search signal;
   transforming said echo signal to an electrical analog signal suitable for display on a cathode ray tube screen;
   providing a signal adapted to produce a digital character display on said screen;
   controlling the numerical value of said digital character display to be responsive to said analog signal, and
   alternatingly displaying on said screen said analog signal and said digital character display.

25. A method for examining a workpiece by the pulse-echo ultrasonic test method comprising the steps of:
   cyclically producing an ultrasonic search signal and transmitting said search signal into the workpiece to be examined;
   sensing the receipt for an acoustic discontinuity responsive echo signal resulting from the transmission of said search signal;
   transforming said echo signal to an echo responsive electrical signal suitable for display versus time on a cathode ray tube screen to provide a scan display;
   providing said echo responsive signal also to digital character signal generating means adapted to produce on said cathode ray tube a display of digital characters whose numerical value is correlated with said echo responsive electrical signal, and
   alternatingly displaying on said screen said scan display and said digital characters.

26. A method for examining a workpiece as set forth in claim 25, said numerical value being commensurate with the amplitude of said echo responsive signal.

27. A method for examining a workpiece as set forth in claim 25, said scan display being displayed on one portion of said screen and said characters on another portion of said screen.

28. A method for examining a workpiece as set forth in claim 25, said scan display and said digital characters being displayed at a frequency causing both to be visible substantially simultaneously for observation.

* * * * *